(12) United States Patent
Henry

(10) Patent No.: US 8,469,219 B1
(45) Date of Patent: Jun. 25, 2013

(54) STEAM VENTILATION SYSTEM

(76) Inventor: Robert J. Henry, Brooklyn, NY (US)

( * ) Notice: Subject to any disclaimer, the term of this patent is extended or adjusted under 35 U.S.C. 154(b) by 1045 days.

(21) Appl. No.: 12/145,260

(22) Filed: Jun. 24, 2008

(51) Int. Cl.
*B65D 51/16* (2006.01)

(52) U.S. Cl.
USPC ... 220/367.1; 220/369; 220/373; 220/203.04; 220/254.1

(58) Field of Classification Search
USPC .............. 220/367.1, 368, 373, 374, 369, 288, 220/254.1, 254.2
See application file for complete search history.

(56) References Cited

U.S. PATENT DOCUMENTS

| | | | | |
|---|---|---|---|---|
| 848,463 A * | 3/1907 | Hearn | | 220/258.3 |
| 1,529,246 A * | 3/1925 | Fenn | | 220/203.16 |
| 2,173,571 A * | 9/1939 | Jesnig | | 137/854 |
| 2,619,255 A * | 11/1952 | Bricout | | 220/323 |
| 3,090,537 A * | 5/1963 | Pasciak | | 220/367.1 |
| 3,187,964 A * | 6/1965 | Foster | | 222/480 |
| 3,362,566 A * | 1/1968 | Hanania | | 220/231 |
| 3,459,324 A * | 8/1969 | Miller | | 220/374 |
| 3,690,514 A * | 9/1972 | Wilson | | 222/81 |
| 3,716,180 A * | 2/1973 | Bemiss et al. | | 229/120 |
| 4,077,537 A * | 3/1978 | Libit | | 215/253 |
| D264,316 S | 5/1982 | Loiseau | | |
| 4,347,946 A * | 9/1982 | Nichols | | 220/375 |
| 4,420,092 A * | 12/1983 | Finkelstein | | 220/254.7 |
| 4,574,972 A * | 3/1986 | Saha | | 220/254.1 |
| 4,757,654 A | 7/1988 | Korhonen et al. | | |
| 5,012,061 A * | 4/1991 | Lesser | | 219/735 |
| 5,255,812 A * | 10/1993 | Hsu | | 220/277 |
| 5,363,978 A * | 11/1994 | Molo | | 220/254.3 |
| 5,750,967 A * | 5/1998 | Sprauer, Jr. | | 219/735 |
| 5,806,703 A * | 9/1998 | Grandi | | 220/203.15 |
| 5,979,647 A * | 11/1999 | Han | | 206/222 |
| 5,989,608 A | 11/1999 | Mizuno | | |
| 6,029,843 A * | 2/2000 | Kroscher et al. | | 220/367.1 |
| 6,053,474 A * | 4/2000 | Stucke et al. | | 251/299 |
| 6,062,413 A * | 5/2000 | Redmond | | 220/266 |
| 6,183,982 B1 * | 2/2001 | Nastasia | | 435/41 |
| 6,299,012 B1 * | 10/2001 | Redmond | | 220/266 |
| 6,307,193 B1 * | 10/2001 | Toole | | 219/735 |
| 6,325,234 B1 * | 12/2001 | Legaspi | | 220/367.1 |
| 6,367,651 B2 * | 4/2002 | Laib et al. | | 220/676 |
| 6,412,637 B1 * | 7/2002 | Saunders et al. | | 206/541 |
| 6,415,939 B1 * | 7/2002 | Redmond | | 220/266 |
| 6,862,980 B2 * | 3/2005 | Heil et al. | | 99/467 |
| 7,001,238 B1 * | 2/2006 | Gonzalez | | 446/418 |
| 7,017,735 B2 * | 3/2006 | Carlson | | 206/222 |
| 7,051,762 B2 | 5/2006 | Haamer | | |
| 7,090,090 B2 * | 8/2006 | Ohyama | | 220/367.1 |
| 7,134,566 B2 * | 11/2006 | Smith et al. | | 220/254.1 |
| 2001/0012530 A1 | 8/2001 | Hiyoshi | | |
| 2002/0000441 A1 * | 1/2002 | Redmond | | 220/266 |
| 2003/0116572 A1 * | 6/2003 | Klock et al. | | 220/367.1 |
| 2004/0232026 A1 * | 11/2004 | Goeking et al. | | 206/459.1 |
| 2005/0092748 A1 * | 5/2005 | Durdon | | 220/254.3 |

* cited by examiner

*Primary Examiner* — Anthony Stashick
*Assistant Examiner* — Christopher McKinley

(57) ABSTRACT

The present invention is directed to a steam ventilation system for providing an easy way to release steam from a container.

12 Claims, 5 Drawing Sheets

BEFORE USE

DURING USE

BEFORE USE

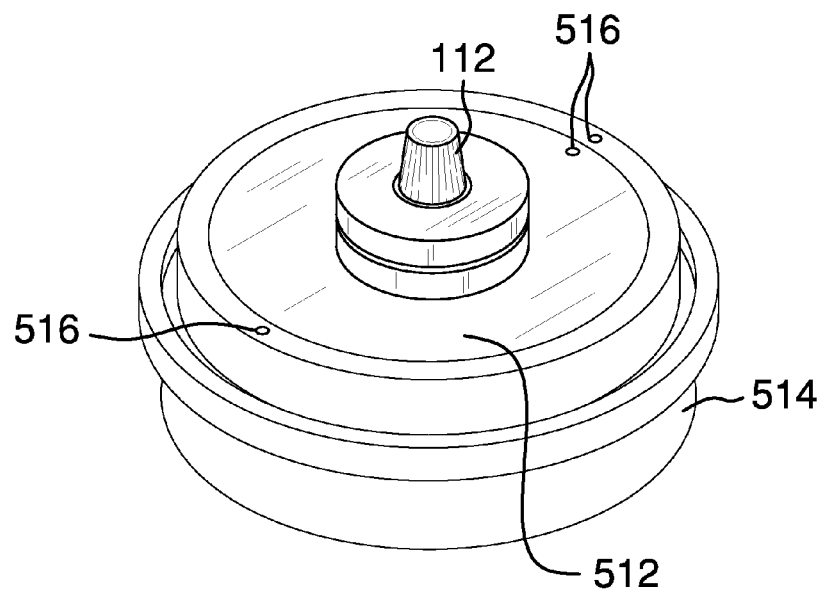
DURING USE  FIG. 1B
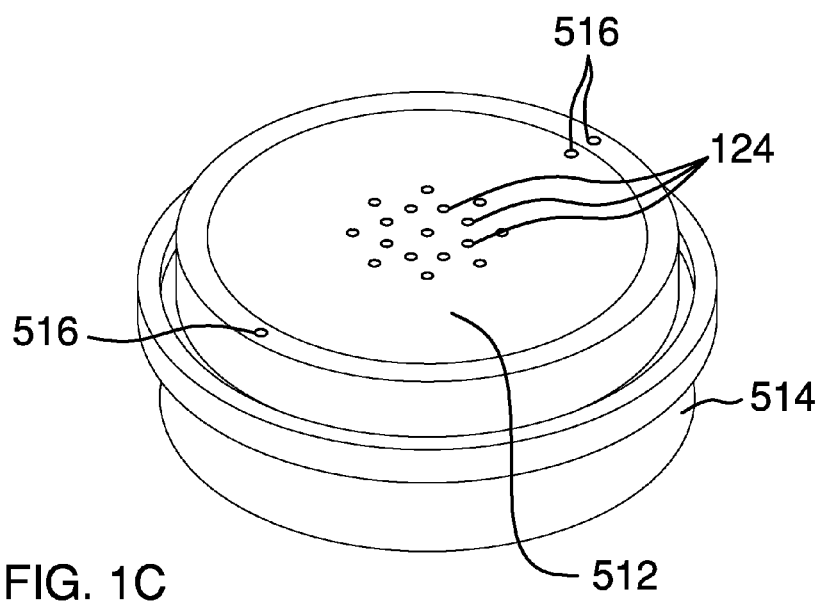
FIG. 1C
AFTER USE

WITH COVER

IN USE SECTION

STEAM VENTILATION SYSTEM

FIELD OF THE INVENTION

The present invention is directed to a steam ventilation system for allowing controlled release of steam from a container.

BACKGROUND OF THE INVENTION

An object of this invention is to provide a steam ventilation system for controlled release of steam a container that has been heated in a microwave. Another object of this invention is to allow a user to keep the contents housed within the container warm after the steam has been released.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIGS. 1A to 1C are perspective views of an embodiment of the steam ventilation system of the present invention.

DESCRIPTION OF PREFERRED EMBODIMENTS

Figure 1A:
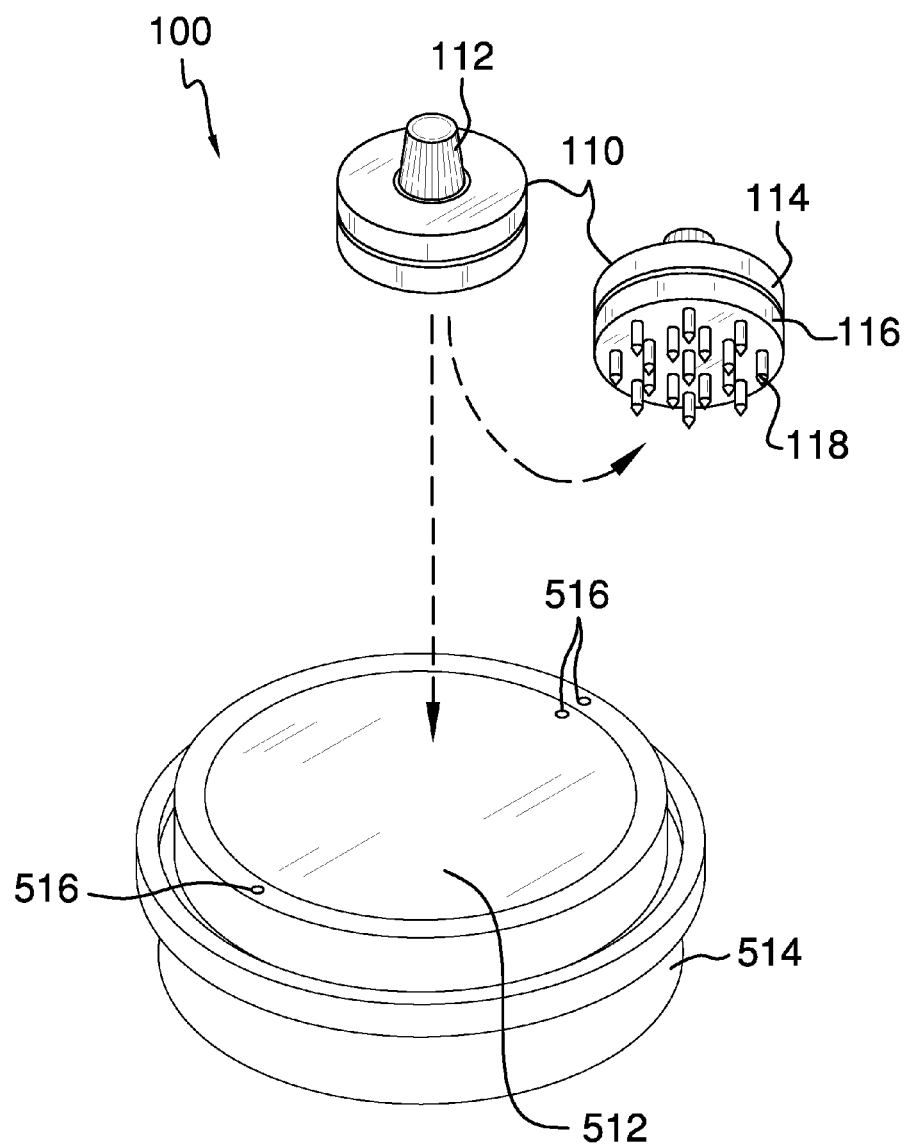
Figure 2:
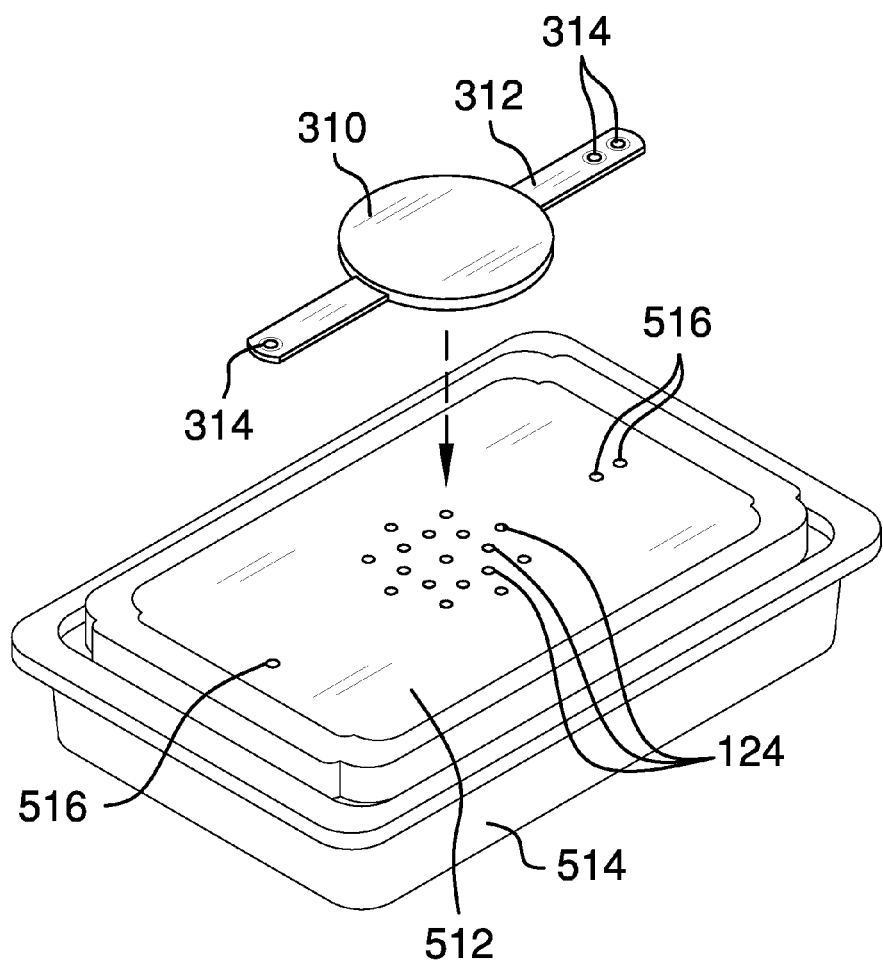
FIG. 2 is perspective view of an embodiment of the steam ventilation system of the present invention.

The following is a listing of numbers corresponding to a particular element refer to herein:
  100 steam ventilation system
  110 top member
  112 handle
  114 top end of top member
  116 bottom end of top member
  118 set of protrusions
  122 plate
  124 puncture holes
  310 cover
  312 strap
  314 attachment device
  512 lid
  514 storage container
  516 snap
  612 liquid heating container
  614 spout
  616 handle
  618 container attachment means
  712 cup Referring now to FIGS. 1-4, the present invention features a steam ventilation system 100 comprising a plastic lid 512, a top member 110, wherein the top member 110 comprises a top end 114 and a bottom end 116, and a storage container 514. A handle 112 is disposed at the top end 114 of the top member 110 and a set of protrusions 118 is disposed on the bottom end 116, wherein the set of protrusions 118 can be used to puncture the lid 512 of the container 514. The present invention also features a steam ventilation system 100 comprising a cover 310 for attaching to the lid 512 of the container 514. In some embodiments, the cover 310 comprises one or more straps extending from the side of the cover 310. In some embodiments, the protrusions 118 have sharp tips 119 which are effective for puncturing through the plastic lid 512 of the storage container 514. In use, after the holes 124 are created on the lid 512, the top member 110 can be placed onto the lid 512 to temporarily seal the holes 124.

In some embodiments, a user may insert the steam ventilation system 100 into the lid 512 of the storage container 514. The user may place the top member 110 into the lid 512 of the container 514 by forcibly inserting the set of protrusions 118, thereby puncturing the lid 512 before placing the storage container 514 in a microwave (see FIG. 1). In some embodiments, steam generated by heating the container 514 may be contained within the container 514. A user may then remove the container 514 from the microwave and remove the top member 110 from the lid 512 to release the steam. In some embodiments, after steam has been released, a user may re-insert the top member 110 into the holes 124 on the lid 512 to help keep the items contained in the container 514 warm.

In some embodiments, after steam has been released from the container 514, a user may attach the cover 310 onto the lid 512 of the container 514. In some embodiments, the cover 310 comprises one or more straps 312 extending from the sides of the cover 310. In some embodiments, one or more attachment devices 314 are disposed on the strap 312, wherein the attachment devices 314 are for securing the cover 310 to the lid 512 of the container 514. In some embodiments, the attachment device 314 includes a snap, a hook, a hook-and-loop fastener, the like, or a combination thereof. In some embodiments, the attachment device 314 is a snap which is then inserted into a snap 516 disposed on the lid 512 of the container 514 (see FIGS. 1-2).

As used herein, the term "about" refers to plus or minus 10% of the referenced number. For example, an embodiment wherein the top member is about 5 inches in diameter includes a top member that is between 4.5 and 5.5 inches in diameter.

The top member 110 and/or the cover 310 may be constructed in a variety of shapes and/or sizes. In some embodiments, the top member 110 is cylindrical. In some embodiments, the top member 110 has a diameter between about 1 to 2 inches. In some embodiments, the top member 110 has a diameter between about 2 to 5 inches. In some embodiments, the top member 110 has a diameter between about 5 to 10 inches.

In some embodiments, the cover 310 is circular. In some embodiments, the cover 310 has a diameter between about 1 to 2 inches. In some embodiments, the cover 310 has a diameter between about 2 to 5 inches. In some embodiments, the cover 310 has a diameter between about 5 to 10 inches.

In certain embodiments, the Get of protrusions 118 are cylindrical.

Figure 3:
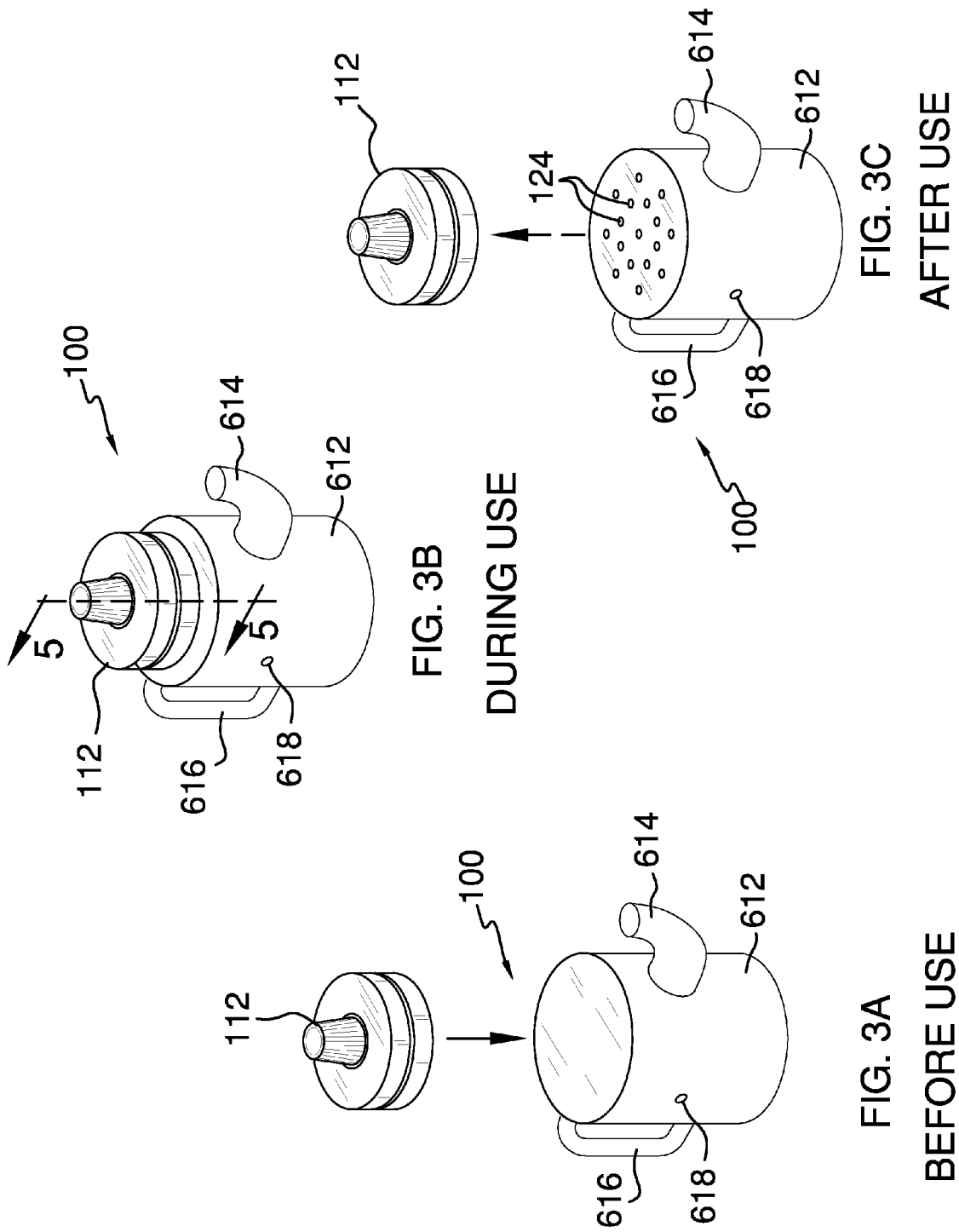
FIGS. 3A to 3C are perspective views of an embodiment of the steam ventilation system of the present invention.

Referring now to FIG. 3, in some embodiments, the steam ventilation system 100 of the present invention is used on a liquid heating container (e.g., teapot) 612. In some embodiments, the top member 110 is forcibly inserted into the lid 512, creating puncture holes 124. After the liquid heating container 612 has been heated, a user may remove the top member 110 to release the steam. In some embodiments, the cover 310 is attached to the lid 512 to keep the liquid warm. In some embodiments, a user may secure the cover 310 to the liquid heating container 612 by attaching the attachment means 314 to the liquid heating container 612. In some embodiments, a container attachment 618 is disposed on the liquid heating container onto which the attachment means device 314 on the strap 312 of the cover 310 may be attached. In some embodiments, a user may pour liquid from within the liquid heating container 612 by grasping the handle 616 and tilting the liquid heating container 612 so liquid pours out of the spout 614.

Figure 4:
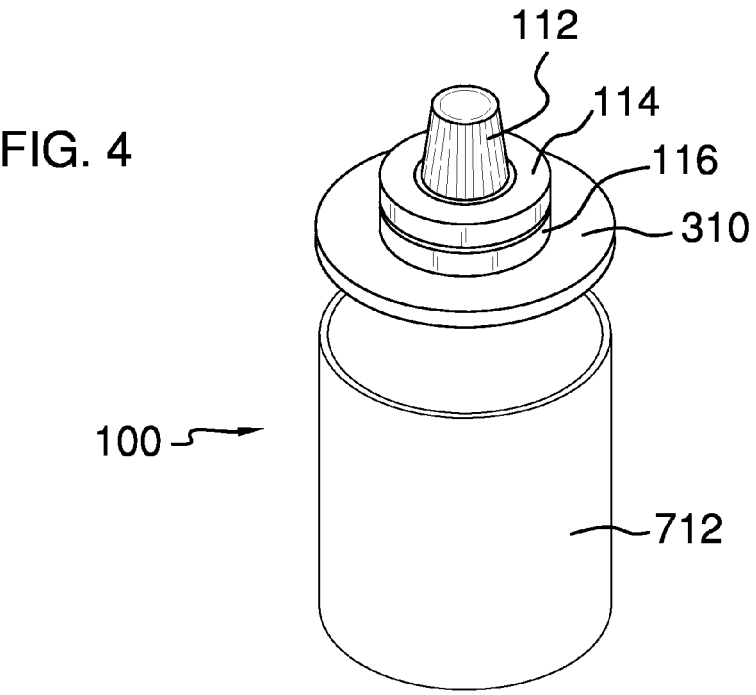
FIG. 4 is a perspective view of an embodiment of the steam ventilation system of the present invention.
Figure 5:
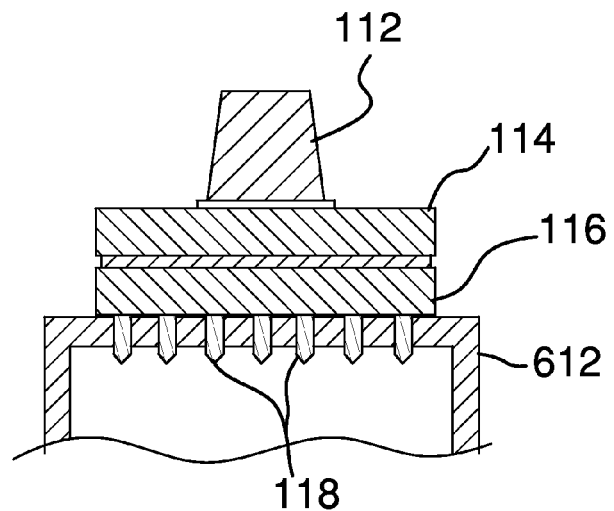
FIG. 5 is a cross-sectional in-use view of an embodiment of the steam ventilation system of the present invention as referenced by FIG. 3B.

As shown in FIG. 4, in some embodiments, the top member 110 may be inserted onto a cup 712. A user may heat the contents of the cup. After heating, a user may remove the top member 110 from the cup 712 to release the steam. In some embodiments, a user may then attach the cover 310 to the cup 712 to keep the contents of the cup 712 warm.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A steam ventilation system comprising:
   (a) a container having container lid;
   (b) a round plate having a raised lip around an outer circumference of the plate, wherein the round plate comprises a plurality of apertures disposed therein, wherein the round plate is centrally disposed in the container lid;
   (c) a cylindrical top member having a top end and a bottom end, wherein a handle is disposed at the top end and a plurality of sharp-tipped protrusions is disposed on the bottom end, wherein the sharp-tipped protrusions are adapted to be inserted into the apertures disposed on the round plate; and
   (d) a plate cover having a flat top, a flat bottom, and a side rim, wherein the side rim of the plate cover is adapted to be attached to the raised tip of the round plate.

2. The steam ventilation system of claim 1, wherein the sharp-tipped protrusions are tubular.

3. The steam ventilation system of claim 1, wherein the top member is between about 1 to 5 inches in diameter.

4. The steam ventilation system of claim 1, wherein the top member is between about 5 to 10 inches in diameter.

5. The steam ventilation system of claim 1, wherein the steam ventilation system is adapted to be used with a microwavable storage container, a liquid heating device, a cup, or a combination thereof.

6. The steam ventilation system of claim 1, wherein the plate cover comprises a strap protruding from the side of the plate cover.

7. The steam ventilation system of claim 6, wherein the strap comprises an attachment means.

8. A steam ventilation system consisting of:
   (a) a container having a container lid;
   (b) a round plate having a raised lip around an outer circumference of the plate, wherein the round plate comprises a plurality of apertures disposed therein, wherein the round plate is centrally disposed in the container lid;
   (c) a cylindrical top member having a top end and a bottom end, wherein a handle is disposed at the top end and a plurality of sharp-tipped protrusions is disposed on the bottom end, wherein the sharp-tipped protrusions are adapted to be inserted into the apertures disposed on the round plate; and
   (d) a plate cover having a flat top, a flat bottom, and a side rim, wherein the side rim of the plate cover is adapted to be attached to the raised tip of the round plate.

9. The steam ventilation system of claim 1, wherein the apertures are circular.

10. The steam ventilation system of claim 1, wherein the round plate is between about 1 to 5 inches in diameter.

11. The steam ventilation system of claim 1, wherein the round plate is between about 5 to 10 inches in diameter.

12. The steam ventilation system of claim 1, wherein the sharp-tipped protrusions of the top member are adapted to be effective for puncturing through a plastic lid of a storage container.

* * * * *